(12) United States Patent
Dyer

(10) Patent No.: US 10,655,569 B2
(45) Date of Patent: May 19, 2020

(54) LEAKAGE PREVENTION SYSTEMS AND METHODS

(71) Applicant: Hamilton Sundstrand Corporation, Charlotte, NC (US)

(72) Inventor: Gerald P. Dyer, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 141 days.

(21) Appl. No.: 15/685,590

(22) Filed: Aug. 24, 2017

(65) Prior Publication Data

US 2019/0063375 A1    Feb. 28, 2019

(51) Int. Cl.

| G01M 15/09 | (2006.01) |
| F02M 25/08 | (2006.01) |
| G01M 3/28 | (2006.01) |
| G01M 3/32 | (2006.01) |
| G01M 3/02 | (2006.01) |
| B01D 19/00 | (2006.01) |

(52) U.S. Cl.
CPC ..... *F02M 25/0809* (2013.01); *B01D 19/0031* (2013.01); *B01D 19/0063* (2013.01); *F02M 25/0836* (2013.01); *G01M 3/025* (2013.01); *G01M 3/2815* (2013.01); *G01M 3/3236* (2013.01)

(58) Field of Classification Search
CPC .............................. G01M 3/025; G01M 15/09
USPC ........................ 73/46, 49.1, 114.38
See application file for complete search history.

(56) References Cited

U.S. PATENT DOCUMENTS

| 5,677,480 A | 10/1997 | Liyanage et al. | |
| 5,762,684 A * | 6/1998 | Hayashi | B01D 19/0063 95/24 |
| 6,315,815 B1 * | 11/2001 | Spadaccini | B01D 19/0031 95/46 |
| 6,709,492 B1 * | 3/2004 | Spadaccini | B01D 19/0031 95/46 |

(Continued)

FOREIGN PATENT DOCUMENTS

EP    3112690 A1    1/2017

OTHER PUBLICATIONS

Partial European Search Report dated Jan. 22, 2019, and received Jan. 17, 2019, issued during the prosecution of corresponding European Patent Application No. EP 18190727.0 (11 pages).

(Continued)

*Primary Examiner* — Eric S. McCall
(74) *Attorney, Agent, or Firm* — Locke Lord LLP; Scott D. Wofsy; Alicia J. Carroll

(57) ABSTRACT

A leak detection and mitigation system includes a gas flow path extending from a gas outlet of a fuel degassing device and an orifice in the gas flow path. A sensor is positioned in the gas flow path upstream from the orifice. The sensor is configured to detect a fuel leak into the gas flow path. A method for leak detection and mitigation in a fuel degassing system includes removing gasses from a fuel stream with a fuel degassing device. The method includes directing gasses removed from the fuel stream through a gas flow path extending from a gas outlet of the fuel degassing device. An orifice is positioned in the gas flow path. The method includes detecting a leak from the fuel stream into the gas flow path by measuring a characteristic in the gas flow path upstream from the orifice with a sensor.

19 Claims, 3 Drawing Sheets

(56) References Cited

U.S. PATENT DOCUMENTS

| | | | |
|---|---|---|---|
| 2004/0186638 A1* | 9/2004 | Lederle | F02M 25/0809 73/40 |
| 2005/0005682 A1* | 1/2005 | Teutsch | F02M 25/0818 73/49.2 |
| 2005/0211096 A1* | 9/2005 | Burlatsky | B01D 19/0031 96/6 |
| 2011/0269034 A1* | 11/2011 | Yamamoto | H01M 8/04022 429/410 |
| 2012/0079873 A1* | 4/2012 | Jackson | B60K 15/03519 73/49.3 |
| 2013/0257457 A1* | 10/2013 | Kato | G01N 33/2852 324/663 |
| 2014/0013944 A1* | 1/2014 | Haag | F02M 25/0818 95/146 |
| 2016/0369758 A1* | 12/2016 | Jeppesen | F02M 37/02 |
| 2017/0016794 A1* | 1/2017 | Dudar | G01M 3/025 |
| 2019/0060791 A1* | 2/2019 | Dyer | F16K 21/04 |

OTHER PUBLICATIONS

Extended European Search Report dated May 8, 2019, issued during the prosecution of European Patent Application No. EP 18190727.0.
Extended European Search Report dated Jul. 30, 2019, issued during the prosecution of European Patent Application No. EP 18190727.0.

* cited by examiner

LEAKAGE PREVENTION SYSTEMS AND METHODS

BACKGROUND

1. Field

The present disclosure relates to fuel systems, more specifically to fuel degassing (e.g., deoxygenation) systems.

2. Description of Related Art

Traditionally, in fuel deoxygenation systems, fuel passes over a bundle of membrane coated hollow tubes with a vacuum applied to the inside of the tubes. Oxygen molecules pass through the membrane, and the fuel is deoxygenated. The membrane that separates the fuel from the vacuum or purge gas may fracture, allowing the fuel to leak from the system into the vacuum and/or purge gas flow path. External fuel leakage can be detrimental to aircraft operation.

Such conventional methods and systems have generally been considered satisfactory for their intended purpose. However, there is still a need in the art for improved leak detection and mitigation systems. The present disclosure provides a solution for this need.

SUMMARY

A leak detection and mitigation system includes a gas flow path extending from a gas outlet of a fuel degassing device and an orifice in the gas flow path. A sensor is positioned in the gas flow path upstream from the orifice. The sensor is configured to detect a fuel leak into the gas flow path.

In accordance with some embodiments, the sensor is a pressure sensor configured to detect if a pressure in the gas flow path exceeds a predetermined threshold. The sensor can be configured to signal that maintenance is required if there is a fuel leak.

In some embodiments, it is contemplated that the system includes a leak protection valve positioned in the gas flow path. The leak protection valve can include a valve housing, a valve piston within the valve housing oriented to slide with respect to the valve housing, and a biasing member operatively connected to the valve piston to bias the valve piston in a rest position. The orifice can be defined as a diametrical clearance between the valve piston and the valve housing. The leak protection valve can include a seal ring operatively connected to a downstream side of the valve housing. In a rest position, the seal ring and the valve piston can be in an unsealed state. In a high pressure position, the valve piston translates a force to the biasing member and the seal ring to seal the leak protection valve. In the high pressure position, a fluid pressure on the upstream side of the valve piston can exceed a biasing force of the biasing member. The sensor can be a position sensor operatively connected to the leak protection valve to detect a fuel leak in the gas flow path based on a position of the valve piston.

In accordance with another aspect, a method for leak detection and mitigation in a fuel degassing system includes removing gasses from a fuel stream with a fuel degassing device. The method includes directing gasses removed from the fuel stream through a gas flow path extending from a gas outlet of the fuel degassing device. An orifice is positioned in the gas flow path. The method includes detecting a leak from the fuel stream into the gas flow path by measuring a characteristic in the gas flow path upstream from the orifice with a sensor. The orifice can be similar to the orifice described above.

The method can include translating a force to a biasing member of the leak protection valve and to a seal ring of the leak protection valve to seal the leak protection valve when a fluid pressure on the upstream side of a valve piston of the leak protection valve exceeds a biasing force of the biasing member. The sensor can be a position sensor operatively connected to the leak protection valve, similar to the position sensor described above. Detecting the leak from the fuel stream into the gas flow path can include measuring a position of the valve piston with the position sensor. The sensor can be a pressure sensor, similar to the pressure sensor described above. Detecting the leak from the fuel stream into the gas flow path can include measuring a pressure in the gas flow path upstream from the orifice and determining whether it exceeds a predetermined threshold. The method can include sending a signal to an engine electronic control system if fuel from the fuel stream leaked into the gas flow path.

In accordance with another aspect, a fuel degassing assembly includes a fuel degassing device having a fuel circuit with a selectively permeable membrane to remove gas from fuel in the fuel circuit. The assembly includes a gas flow path for receiving gas removed from the fuel circuit, wherein the gas flow path extends from a gas outlet of the fuel degassing device. The assembly includes an orifice in the gas flow path and a sensor in the gas flow path upstream from the orifice. The sensor is configured to detect a fuel leak from the selectively permeable membrane into the gas flow path and signal that maintenance is required if there is a fuel leak.

The sensor can be a pressure or positions sensor, as described above. The assembly can include a leak protection valve, as described above. The orifice can be defined as a diametrical clearance between the valve piston and the valve housing, as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
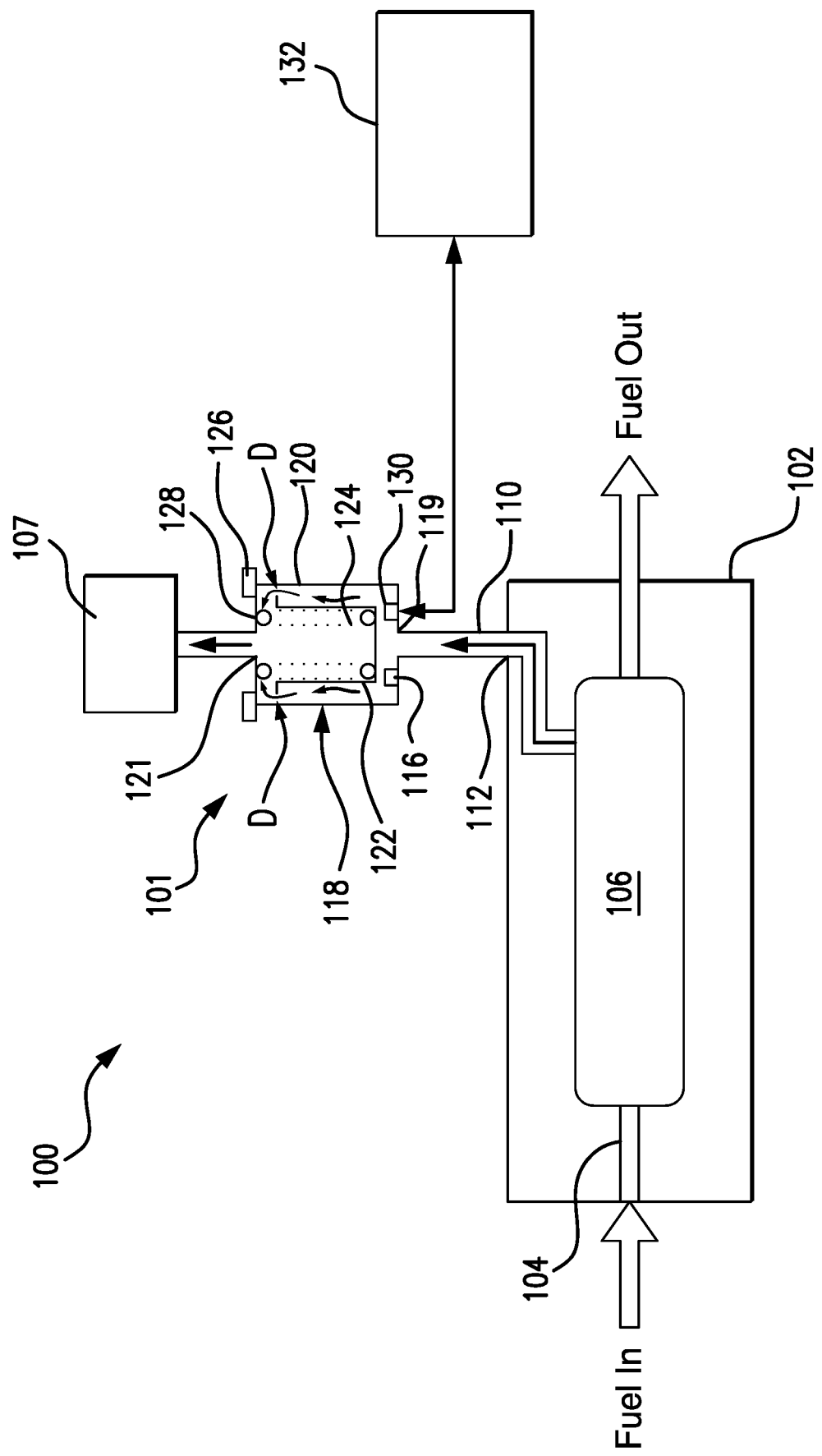
FIG. 1 is a schematic depiction of an embodiment of a fuel degassing assembly having a leak detection and mitigation system constructed in accordance with this disclosure, showing the valve of the leak detection and mitigation system in a rest position.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. The systems and methods described herein can be used to detect and mitigate fuel leaks from a fuel degassing device into a vacuum and/or purge gas flow path.

As shown in FIG. 1, a fuel degassing assembly 100 includes a fuel degassing device 102 having a fuel circuit 104 with a selectively permeable membrane 106 to remove gas from fuel in the fuel circuit 104. The assembly 100 includes a gas flow path 110 for receiving gas removed from the fuel circuit 104. The gas flow path 110 extends from a gas outlet 112 of the fuel degassing device 102. The assembly 100 includes a leak detection and mitigation system 101 in the gas flow path 110. The system 101 mitigates a potential failure mode of fuel degassing device 100 where fuel leaks through a membrane, e.g. selectively permeable membrane 106. As an option, system 101 can alert the pilot or maintenance crew that the failure has occurred, and that maintenance is required.

With continued reference to FIG. 1, the system 101 includes a leak protection valve 118 positioned in the gas flow path 110. The leak protection valve 118 includes a valve housing 120, and a valve piston 122 within the valve housing 120. The valve piston 122 is oriented to slide with respect to the valve housing 120. The valve 118 includes a biasing member 124 operatively connected to the valve piston 122 to bias the valve piston 122 in a rest position. An orifice is defined as a diametrical clearance D between the valve piston 122 and the valve housing 120. While shown schematically in FIG. 1 as a visible clearance, it is contemplated that this diametrical clearance D may not be visible to the naked eye. The leak protection valve 118 includes a seal ring 126 operatively connected to a downstream side 128 of the valve housing 120. In the rest position, as shown in FIG. 1, the seal ring 126 and the valve piston 122 are in an unsealed state, meaning that the diametrical clearance D allows for fluid flow around the valve piston 122 and an outlet 121 of the valve housing 120 is not sealed, such that fluid can flow from an inlet 119 of the valve housing 120 to the outlet 121 of the valve housing 120.

Normally, only oxygen gas is flowing through the valve 118. Oxygen leaves the fuel degassing device 102, and flows around the valve through the diametrical clearance D, and out to a vacuum 107. Because oxygen, or other suitable gases, typically flow at a very low rate from the gas outlet 112, the pressure drop generated across the valve 118 is small. In other words, the pressure build-up and force due to pressure on an upstream side of the valve 118 is small. Therefore, in normal operation, the biasing member 124, e.g. the spring, will hold the valve 118 in an upstream rest position, as shown in FIG. 1. If there were a failure of the membrane 106, and fuel was to leak through the gas path 110, e.g. a vacuum path, due to the high flow rate of the fuel from the fuel circuit 104 it would generate a high pressure drop. In other words, the flow rate would cause a pressure build-up on an upstream side of the valve 118. This pressure build-up would translate to a force on the valve piston 122 and would overcome the force of the biasing member 124, e.g. the spring force, and the valve piston 122 would translate upwards against the seal 126.

Figure 2:
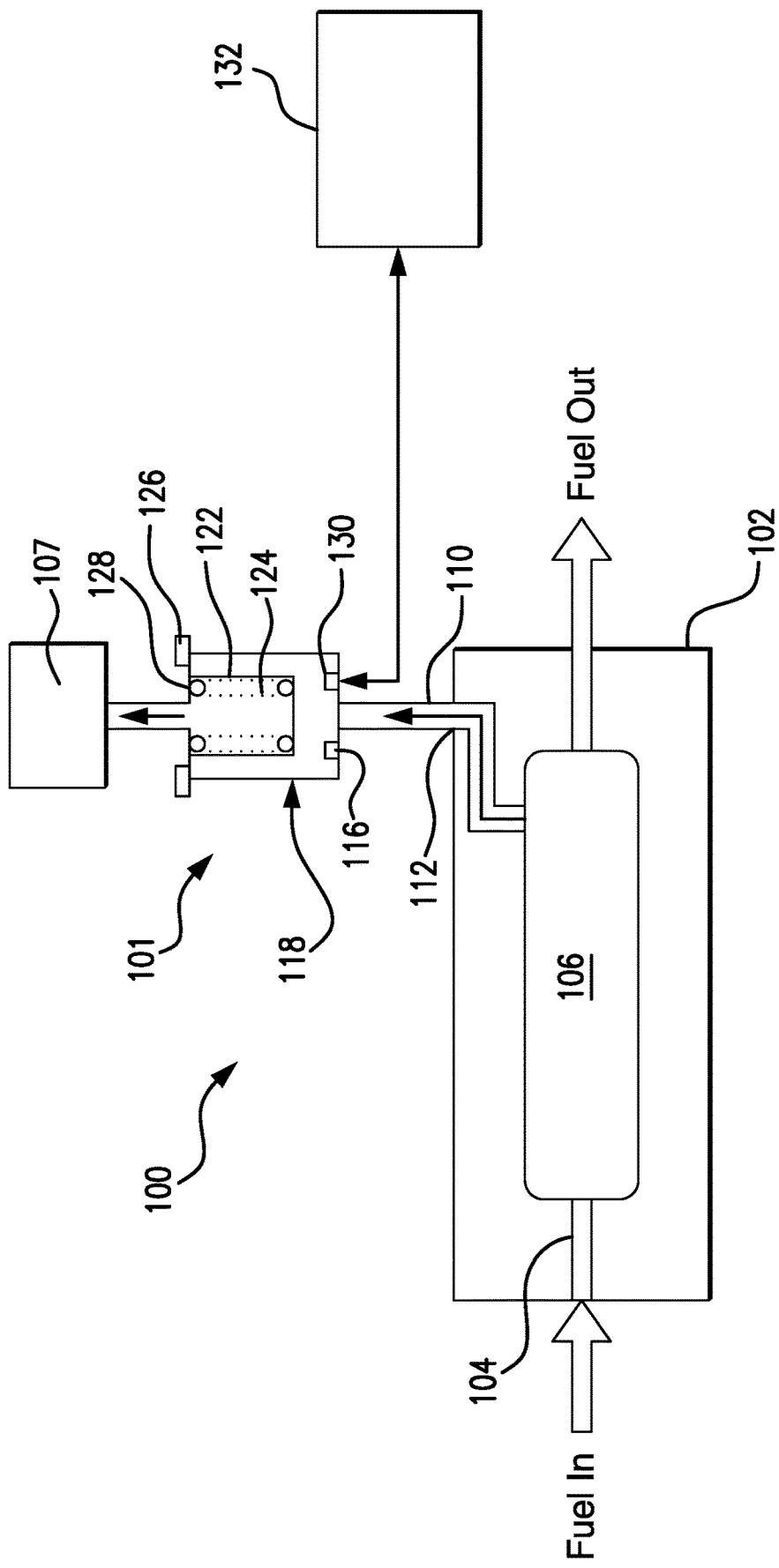
FIG. 2 is a schematic depiction of an embodiment of the fuel degassing assembly of FIG. 1, showing the valve of the leak detection and mitigation system in a sealed position.

In a high pressure position, shown in FIG. 2, the valve piston 122 translates a force to the biasing member 124 and the seal ring 126 to seal the leak protection valve 118, thereby sealing off fluid flow from escaping the valve 118 via the diametrical clearance D. In the high pressure position, a fluid pressure on the upstream side of the valve piston 122 exceeds a biasing force of the biasing member 124. The system 101 includes a position sensor 130 operatively connected to the leak protection valve 118 to detect a fuel leak in the gas flow path 110 based on a position of the valve piston 122. The position sensor can be a Linear Variable Differential Transformer (LVDT), proximity switch, or the like. In a leak scenario that causes high pressure on the upstream side of the valve piston 122, the valve piston slides in a downstream direction to abut and seal against the seal ring 126. The position sensor 130 detects that position change and sends a signal to the engine electronic control system (EECS 132) to indicate that a leak has occurred. At the same time, leak protection valve 118 also closes off gas flow path 110, thereby mitigating any further damage due to the fuel leak.

With continued reference to FIG. 2, the system 101 includes a pressure sensor 116 is positioned in the gas flow path 110 upstream from the leak protection valve 118 (or other orifice as will be described below) to detect a fuel leak into the gas flow path 110. If a pressure in the gas flow path 110 exceeds a predetermined threshold, a fuel leak is detected and the pressure sensor 116 signals that maintenance is required if there is a fuel leak. Both position sensor 130 and pressure sensor 116 are configured to signal that system 101 should be shutdown, can automatically send a shutdown signal, and/or can send a maintenance signal.

Figure 3:
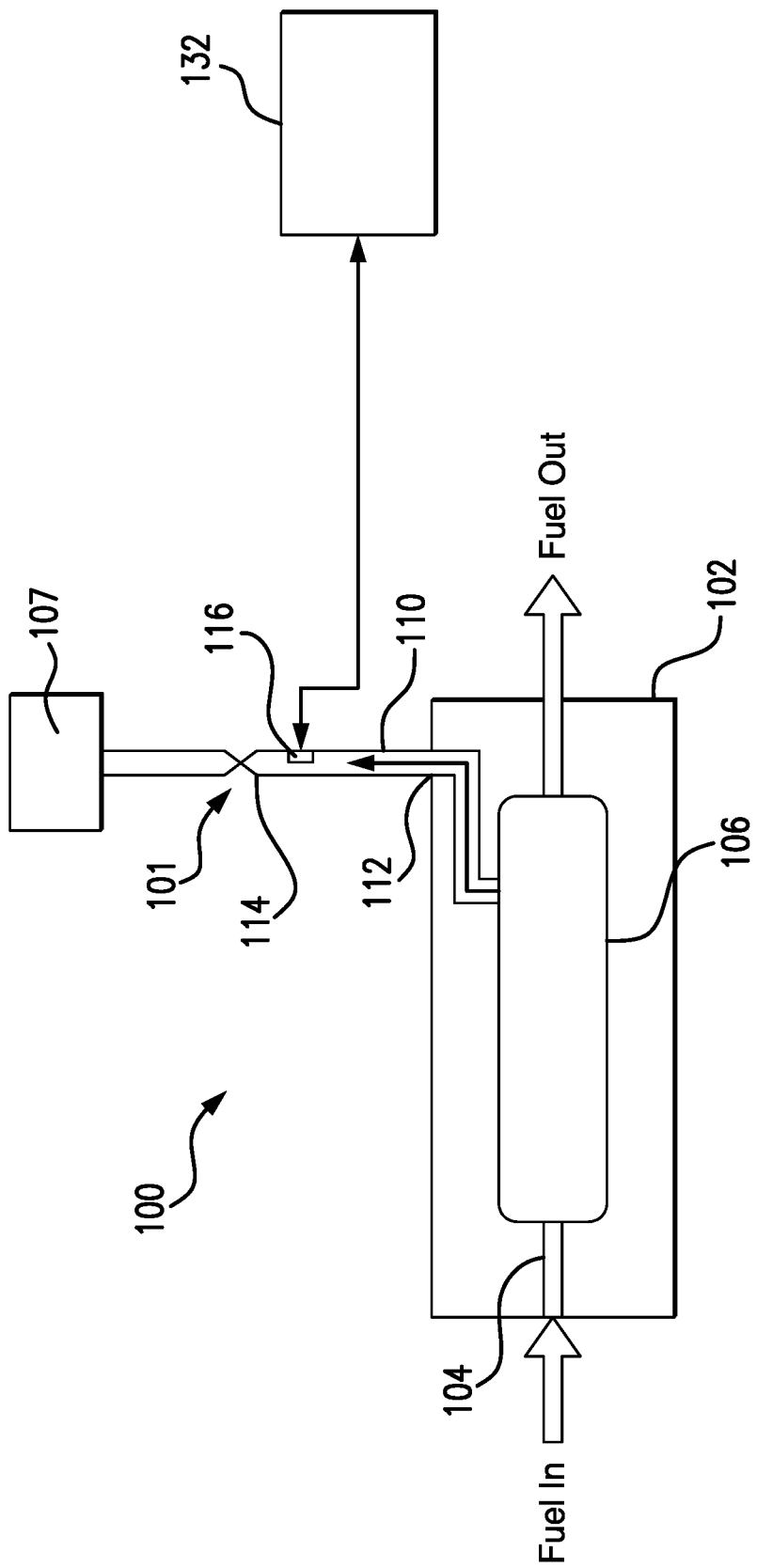
FIG. 3 is a schematic depiction of another embodiment of a fuel degassing assembly having a leak detection and mitigation system constructed in accordance with this disclosure, showing an orifice downstream from the gas outlet of the fuel degassing device.

In accordance with some embodiments, as shown in FIG. 3, it is contemplated that instead of, or in addition to, the leak protection valve 118, an orifice 114 can positioned in the gas flow path 110 downstream of the gas outlet 112. A pressure sensor 116 can be positioned upstream from the orifice 114, between the orifice 114 and the gas outlet 112 to take pressure measurements. In the event there is a fuel leak, the pressure caused by the buildup of pressure from the fuel in the gas flow path upstream from the orifice 114 will be measured by the pressure sensor 116 and may exceed a pre-determined threshold. If the pre-determined threshold is exceed by the pressure measured by sensor 116, a maintenance signal or the like can be sent to the EECS 132, or other system. While orifice 114 is shown in without the leak protection valve 118, it is contemplated that the orifice 114 can be used in conjunction with leak protection valve 118. For example, the orifice 114 can be placed upstream from the leak protection valve 118, or orifice 114 can be placed in a parallel gas flow path that stems from the gas flow path 110.

A method for leak detection and mitigation in a fuel degassing system, e.g. system 101, includes removing gasses from a fuel stream with a fuel degassing device, e.g. the fuel degassing device 102. The method includes directing gasses removed from the fuel stream through a gas flow path, e.g. the gas flow path 110, extending from a gas outlet, e.g. the gas outlet 112, of the fuel degassing device. An orifice, e.g. the orifice 114 or diametrical clearance D, is positioned in the gas flow path. The method includes detecting a leak from the fuel stream into the gas flow path 110 by measuring a characteristic in the gas flow path 110 upstream from the orifice with a sensor, e.g. the pressure sensor 116 or the position sensor 130. The method includes sending a signal to an engine electronic control system, e.g. the EECS 132, if fuel from the fuel stream leaked into the gas flow path.

In accordance with some embodiments, the orifice can be a diametrical clearance, e.g. the diametrical clearance D, in a leak protection valve, e.g. the leak protection valve 118.

The method includes translating a force to a biasing member, e.g. the biasing member 124, of the leak protection valve, and to a seal ring, e.g. the seal ring 126, of the leak protection valve to seal the leak protection valve when a fluid pressure on the upstream side of a valve piston, e.g. the valve piston 122, of the leak protection valve exceeds a biasing force of the biasing member 124. Detecting the leak from the fuel stream into the gas flow path includes measuring a position of the valve piston with a sensor, e.g. the position sensor 130.

Embodiments can be applied to any suitable fluid degassing systems, not just fuel. For example, certain embodiments can be a general fluid degassing device and the material that makes up the selective permeable membranes can be selected based on the desired gas to be removed as appreciated by those having ordinary skill in the art. Embodiments of the disclosure increase the safety of degassing devices, such as oxygen removal units in jet engine applications, making deoxygenation systems more suitable for passenger aircraft.

The methods and systems of the present disclosure, as described above and shown in the drawings, provide for leak detection systems degassing devices with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A leak detection and mitigation system, comprising:
   a gas flow path extending from a gas outlet of a fuel degassing device;
   an orifice in the gas flow path;
   a leak protection valve positioned in the gas flow path for leak mitigation; and
   a sensor in the gas flow path upstream from the orifice, wherein the sensor is configured to detect a fuel leak into the gas flow path, wherein the sensor is a position sensor operatively connected to the leak protection valve to detect a fuel leak in the gas flow path based on a position of a valve piston of the valve.

2. The leak detection and mitigation system recited in claim 1, further comprising a pressure sensor in the gas flow path configured to detect if a pressure in the gas flow path exceeds a predetermined threshold.

3. The leak detection and mitigation system recited in claim 1, wherein the leak protection valve includes a valve housing, wherein the valve piston is within the valve housing and oriented to slide with respect to the valve housing, and wherein the leak protection valve includes a biasing member operatively connected to the valve piston to bias the valve piston in a rest position.

4. The leak detection and mitigation system recited in claim 3, wherein the orifice is defined as a diametrical clearance between the valve piston and the valve housing.

5. The leak detection and mitigation system recited in claim 3, wherein the leak protection valve includes a seal ring operatively connected to a downstream side of the valve housing.

6. The leak detection and mitigation system recited in claim 5, wherein in the rest position the seal ring and the valve piston are in an unsealed state.

7. The leak detection and mitigation system recited in claim 5, wherein in a high pressure position the valve piston translates a force to the biasing member and the seal ring to seal the leak protection valve.

8. The leak detection and mitigation system recited in claim 7, wherein in the high pressure position, a fluid pressure on the upstream side of the valve piston exceeds a biasing force of the biasing member.

9. A method for leak detection and mitigation in a fuel degassing system, the method comprising:
   removing gasses from a fuel stream with a fuel degassing device;
   directing gasses removed from the fuel stream through a gas flow path extending from a gas outlet of the fuel degassing device, wherein an orifice is positioned in the gas flow path; and
   detecting a leak from the fuel stream into the gas flow path by measuring a characteristic in the gas flow path upstream from the orifice with a sensor, wherein the sensor is a position sensor operatively connected to a leak protection valve for leak mitigation, wherein detecting the leak from the fuel stream into the gas flow path includes measuring a position of a valve piston of the valve with the position sensor.

10. The method as recited in claim 9, wherein a second sensor is positioned in the gas flow path, wherein the second sensor is a pressure sensor, wherein detecting the leak from the fuel stream into the gas flow path includes measuring a pressure in the gas flow path upstream from the orifice and determining whether it exceeds a predetermined threshold.

11. The method as recited in claim 9, wherein the orifice is defined as a diametrical clearance in the leak protection valve, wherein the leak protection valve is positioned within the gas flow path to seal the gas flow path in a leak scenario.

12. The method as recited in claim 11, the method includes translating a force to a biasing member of the leak protection valve and to a seal ring of the leak protection valve to seal the leak protection valve when a fluid pressure on the upstream side of the valve piston of the leak protection valve exceeds a biasing force of the biasing member.

13. A fuel degassing assembly, comprising:
   a fuel degassing device having a fuel circuit with a selectively permeable membrane to remove gas from fuel in the fuel circuit;
   a gas flow path for receiving gas removed from the fuel circuit, wherein the gas flow path extends from a gas outlet of the fuel degassing device;
   an orifice in the gas flow path;
   a leak protection valve positioned in the gas flow path for leak mitigation; and
   a sensor in the gas flow path upstream from the orifice, wherein the sensor is configured to detect a fuel leak from the selectively permeable membrane into the gas flow path, wherein the sensor is a position sensor operatively connected to the leak protection valve to detect a fuel leak in the gas flow path based on a position of a valve piston of the valve.

14. The fuel degassing assembly recited in claim 13, further comprising a pressure sensor positioned in the gas flow path configured to detect if a pressure in the gas flow path exceeds a predetermined threshold.

15. The fuel degassing assembly recited in claim 13, wherein the leak protection valve positioned in the gas flow path downstream from the gas outlet, wherein the leak protection valve includes a valve housing, a valve piston within the valve housing oriented to slide with respect to the valve housing, and a biasing member operatively connected to the valve piston to bias the valve piston in a rest position.

16. The fuel degassing assembly recited in claim 15, wherein the orifice is defined as a diametrical clearance between the valve piston and the valve housing.

17. The fuel degassing assembly recited in claim 15, wherein the leak protection valve includes a seal ring operatively connected to a downstream side of the valve housing.

18. The fuel degassing assembly recited in claim 1, wherein in the rest position the seal ring and the valve piston are in an unsealed state, and wherein in a high pressure position the valve piston translates a force to the biasing member and the seal ring to seal the leak protection valve.

19. A leak detection and mitigation system, comprising:
- a gas flow path extending from a gas outlet of a fuel degassing device;
- an orifice in the gas flow path;
- a sensor in the gas flow path upstream from the orifice, wherein the sensor is configured to detect a fuel leak into the gas flow path; and
- a leak protection valve positioned in the gas flow path, wherein the leak protection valve includes a valve housing, a valve piston within the valve housing oriented to slide with respect to the valve housing, and a biasing member operatively connected to the valve piston to bias the valve piston in a rest position, wherein the leak protection valve includes a seal ring operatively connected to a downstream side of the valve housing, wherein in a high pressure position the valve piston translates a force to the biasing member and the seal ring to seal the leak protection valve, wherein in the high pressure position, a fluid pressure on the upstream side of the valve piston exceeds a biasing force of the biasing member.

* * * * *